March 27, 1962   C. PAYNE ET AL   3,026,600
LATHE OR OTHER LIKE CUTTING TOOLS
Filed June 29, 1960
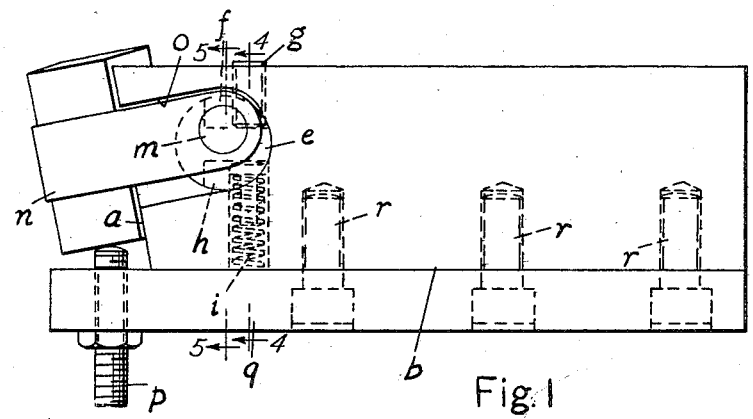
Fig. 1
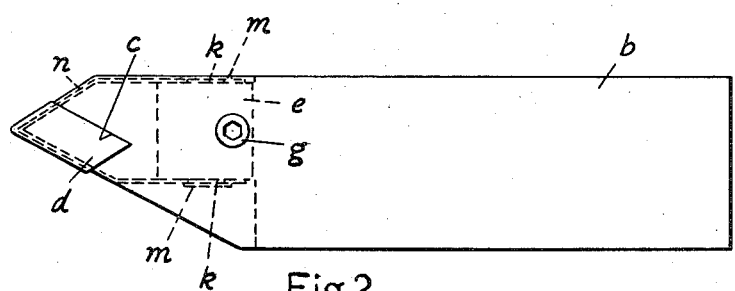
Fig. 2
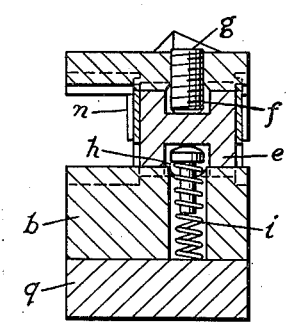
Fig. 4
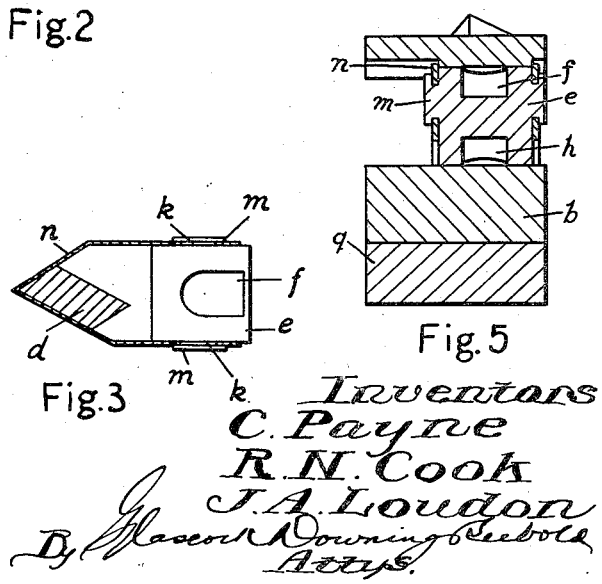
Fig. 3
Fig. 5
Inventors
C. Payne
R. N. Cook
J. A. Loudon
By Mason Downing Seebold
Attys.

United States Patent Office 3,026,600
Patented Mar. 27, 1962

3,026,600
LATHE OR OTHER LIKE CUTTING TOOLS
Colin Payne, Coventry, Richard Nigel Cook, Kenilworth, and John Alexander Loudon, Berkswell, near Coventry, England, assignors to Wickman Limited, Coventry, England
Filed June 29, 1960, Ser. No. 39,559
Claims priority, application Great Britain July 20, 1959
2 Claims. (Cl. 29—96)

This invention relates to lathe or like cutting tools of the kind comprising a cutting-bit and a shank to which the bit is detachably secured, the object of the invention being to enable the bit to be attached to the shank in a ready and convenient manner.

A tool in accordance with the invention comprises a shank having at its forward end a notch for reception of the cutting-bit, a substantially U-shaped clamping strap adapted to embrace the bit and to extend along the opposite side faces of the shank, a cylindrical strap-tightening member rotatably contained in a transverse bore in the shank and having thereon a shoulder for engagement by an actuating screw in the shank and eccentric trunnions at its ends for engaging holes in the side members of the strap.

In the accompanying drawings FIGURE 1 is a side elevation and FIGURE 2 a plan of a tool embodying the invention.

FIGURE 3 is a fragmentary plan showing the cutting-bit, clamping strap, and the strap tightening member.

FIGURES 4 and 5 are sections taken respectively on the lines 4—4 and 5—5 in FIGURE 1.

In the example illustrated by the drawings, the forward end $a$ of the shank $b$ is rearwardly inclined at a small angle to the upper and lower sides of the shank (which is of substantially rectangular section), and in the said end is formed a V-shaped notch $c$ in which can be located a cutting-bit $d$ of rhomboidal or like section, the bit being adjustable in the notch in the direction of its length. The bit may be made from hard metal or any other material appropriate to the duty to be performed by the tool.

In the forward end of the shank is formed a transverse cylindrical bore for reception of a rotatable cylindrical member $e$ on one side of which is formed a recess $f$ which presents a shoulder to an actuating screw $g$ inserted in the shank. Preferably two such recesses are formed on opposite sides of the said member, the other one $h$ of which supports a spring $i$ contained in the shank for moving the said member in the opposite direction to the screw $g$. Also on the ends of the said member $e$ are formed a pair of eccentric trunnions $k$ on each of which is formed a circumferential groove $m$ for the purpose hereinafter mentioned.

For securing the bit $d$ to the shank a metal strap $n$ of substantially U-shape is provided, the strap being adapted to embrace a convenient length of the bit. The side members of the strap extend along the sides of the shank and have formed in their free ends a pair of circular holes for engagement with the circumferential grooves $m$ above mentioned on the trunnions $k$. Preferably shallow recesses $o$ are formed in the sides of the shank to accommodate the side members of the strap.

After the bit has been placed in position the strap is tightened by actuation of the screw $g$ above-mentioned. When it is required to detach the bit the screw is retracted, and an opposite angular movement is then imparted to the cylindrical member by the spring $i$.

For supporting the end of the bit remote from its cutting end, there may be provided an abutment which is conveniently in the form of a screw $p$ which can serve also for effecting longitudinal adjustment of the bit, the screw $p$ being carried by a bar $q$ secured to the underside of the shank $b$ by screws as $r$.

The invention is not, however, restricted to the example above described, as the shape of the shank or bit may be varied to suit different requirements.

Having thus described our invention what we claim as new and desire to secure by Letters Patent is:

1. A cutting-bit holder comprising in combination a shank having at one end a notch for accommodating a complementary part of a cutting-bit, and having near said end a transverse cylindrical bore and a screw-threaded hole opening into said transverse bore at a position intermediate the ends thereof, the axis of said screw-threaded hole being at right angles to, and off-set from, the axis of said transverse bore, a substantially U-shaped metal strap for embracing the cutting-bit when the latter is in engagement with said notch, the side portions of said strap being disposed at opposite sides respectively of said shank, and being provided respectively with a pair of holes at positions adjacent the corresponding ends of said transverse bore, a cylindrical member rotatably fitted within said transverse bore, and provided intermediate its ends with a shoulder, a pair of circumferentially grooved trunnions provided respectively on opposite ends of said cylindrical member at positions eccentric to the axis thereof, and engaging the holes in the adjacent side portions of said strap, means for imparting rotational movement in one direction to said cylindrical member, and thereby causing said trunnions to pull said strap to a position in which the cutting-bit can be gripped tightly between the notch in the end of said shank and the adjacent portion of said strap, which means consists of an adjusting screw in engagement with the screw-threaded hole in said shank, and abutting at one end against the shoulder on said cylindrical member, and additional means for imparting rotational movement to said cylindrical member in the opposite direction.

2. A cutting-bit holder according to claim 1, wherein said shank is provided with a second hole opening into said transverse bore at a position opposite to said screw-threaded hole, said cylindrical member is provided with a second shoulder adjacent said second hole, and said additional means comprises a spring situated in said second hole and acting on said second shoulder.

References Cited in the file of this patent

UNITED STATES PATENTS

| 2,716,799 | Bader | Sept. 6, 1955 |
| 2,903,783 | Kralowetz | Sept. 15, 1959 |

FOREIGN PATENTS

| 1,138,824 | France | Feb. 4, 1957 |